United States Patent [19]

Peer et al.

[11] 4,104,567
[45] Aug. 1, 1978

[54] TELEVISION RASTER WIDTH REGULATION CIRCUIT

[75] Inventors: John Charles Peer; David Warren Luz, both of Indianapolis, Ind.

[73] Assignee: RCA Corporation, New York, N.Y.

[21] Appl. No.: 762,097

[22] Filed: Jan. 24, 1977

[51] Int. Cl.² .................. H01J 29/70; H01J 29/72
[52] U.S. Cl. ...................................... 315/387; 358/190
[58] Field of Search ............... 315/387, 388, 389, 411, 315/370; 358/190

[56] References Cited
U.S. PATENT DOCUMENTS 3,626,238  12/1971  Forster ................................. 315/387
3,832,595  8/1974  Dietz ..................................... 358/190

Primary Examiner—Maynard R. Wilbur
Assistant Examiner—T. M. Blum
Attorney, Agent, or Firm—Eugene M. Whitacre; Paul J. Rasmussen; Joseph Laks

[57] ABSTRACT

A voltage regulator provides a regulated B+ voltage to the horizontal deflection circuit of a television receiver. A positive feedback loop senses the load current drawn by the deflection circuit. The positive feedback voltage increases the magnitude of a reactive impedance component of the voltage regulator as the load current increases in order to maintain a substantially constant raster width.

19 Claims, 6 Drawing Figures

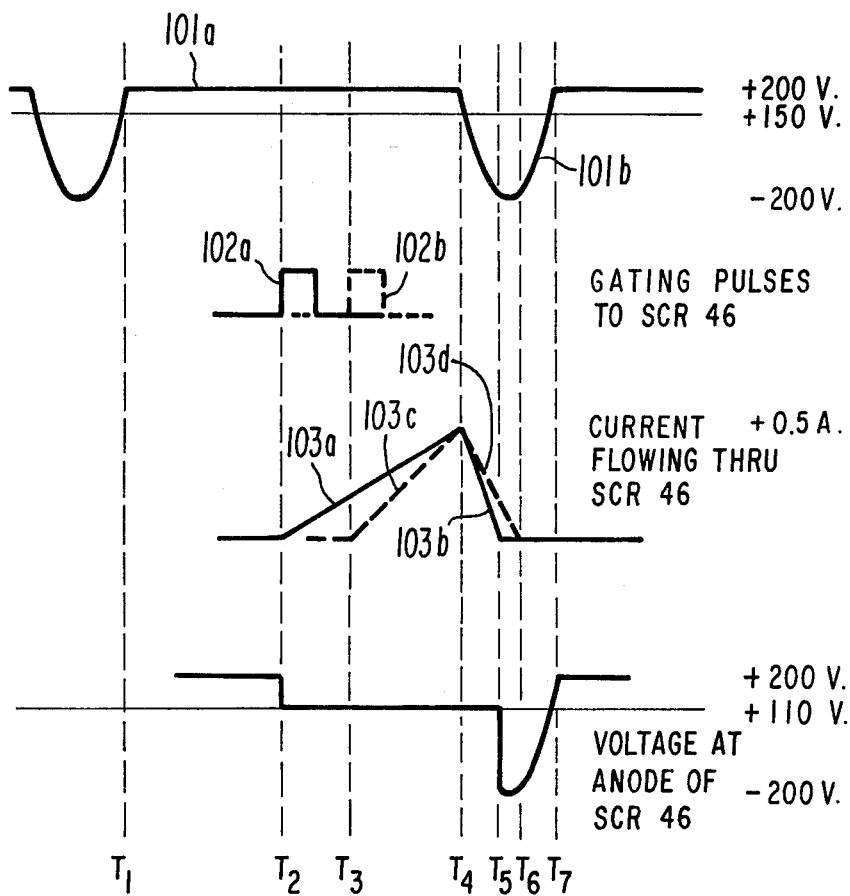

TELEVISION RASTER WIDTH REGULATION CIRCUIT

BACKGROUND OF THE INVENTION

This invention relates to regulation of the raster size of a television receiver.

The accelerating potentials, such as ultor voltages for the electron beams of a cathode ray tube of a television receiver, are obtained from the high voltage circuits of the horizontal output transformer. The width of each horizontal raster line will vary with variations in accelerating potential, the width increasing with decreasing ultor voltage. This effect is commonly called blooming. Decreasing ultor voltage can be caused by heavy beam current loading of the high voltage circuits of the output transformer.

Raster line width is also determined by the magnitude of the voltage applied across the horizontal deflection winding during the trace interval of the deflection cycle, the width of the raster line decreasing with decreasing voltage applied across the winding. The voltage across the winding is frequently derived from a regulated B+ voltage coupled to the horizontal deflection circuit. Heavy video loading will result in an increased load current being drawn from the B+ voltage source by the horizontal deflection circuit.

To compensate for the effects of blooming, prior art circuits, such as disclosed in U.S. Pat. No. 3,444,426, granted to M. E. Buechel, have placed a resistance in series with the load. The increased voltage drop across the resistance decreases the voltage across the deflection winding, decreasing the raster line width. Such raster line width regulation, however, undesirably increases power dissipation. The aforementioned patent also includes a series pass transistor in the connection between the B+ supply and the deflection circuit that functions primarily to introduce a parabolic waveform for pincushion distortion correction.

Other circuits, such as disclosed in U.S. Pat. No. 3,626,238, granted to G. Forster, have used 60 cycle SCR phase controlled voltage regulators for providing regulated B+ voltage. An RC filter arrangement, in order to eliminate the 60 Hz ripple, places relatively large valued resistors in series with the horizontal deflection circuit. When heavy load current is drawn, the voltage coupled to the horizontal deflection winding, because of the IR voltage drop across the resistors, decreases much more than is needed to compensate for blooming. A negative feedback loop senses the voltage drop and increases the conduction angle of the SCR to increase the B+ voltage, thereby obtaining the correct raster width. As with the first mentioned prior art circuits, the correct voltage needed to prevent blooming is obtained by decreasing the voltage applied to the deflection winding through use of resistive voltage drops, thereby undesirably increasing the power dissipation.

SUMMARY OF THE INVENTION

A raster width regulation circuit comprises a variable impedance responsive to a source of unregulated voltage for providing a first direct current voltage to a deflection circuit. The variable impedance includes a reactive impedance component. The deflection circuit draws a load current from the variable impedance. Feedback means coupled to the variable impedance and responsive to the load current provides a feedback voltage for increasing the magnitude of the reactive impedance as the load current increases for maintaining a substantially constant raster width.

BRIEF DESCRIPTION OF THE INVENTION

FIGS. 3a – 3d are waveforms associated with the circuit of FIG. 2.

DESCRIPTION OF THE INVENTION

Figure 1:
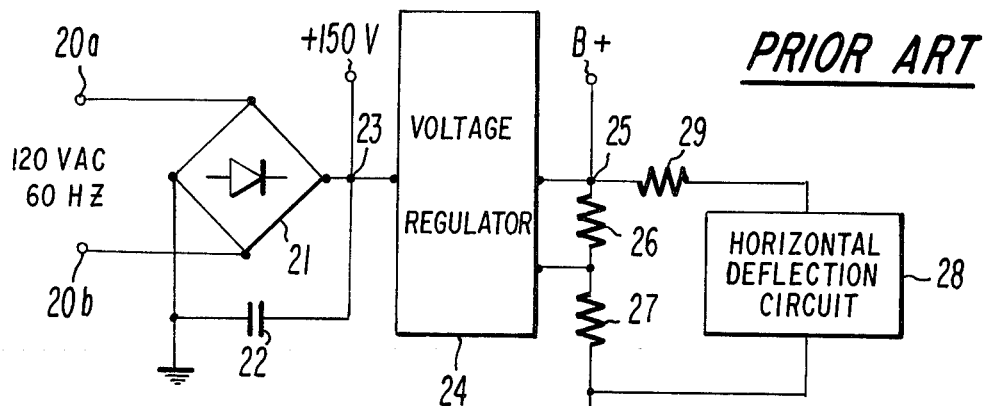
FIG. 1 illustrates a prior art circuit for raster width regulation.

In the prior art circuit of FIG. 1, AC line voltage at terminals 20a and 20b is coupled to the input terminals of a full wave bridge rectifier 21. A filter capacitor 22 is coupled between the output terminals of bridge rectifier 21 and a partially filtered but unregulated DC voltage, illustratively shown as +150 volts, is obtained at a terminal 23. The +150 volts is further filtered and also regulated against line and load variations by a voltage regulator 24. A regulated B+ voltage is obtained at an output terminal 25. A feedback voltage representative of the B+ voltage is obtained at the junction of a resistor 26 and a resistor 27 and is coupled back to the voltage regulator. The feedback loop maintains the B+ voltage at output terminal 25 constant despite load and line variations.

The B+ voltage is coupled to a horizontal deflection circuit 28 through a resistor 29. As the load current drawn by the horizontal deflection circuit increases, as, for example, due to video loading of the high voltage circuit, more voltage is dropped across resistor 29, conventionally providing for raster width regulation. Since the variations in voltage coupled to the horizontal deflection circuit is obtained entirely by varying the voltage drop across a resistance, relatively large power dissipation occurs.

Figure 2:
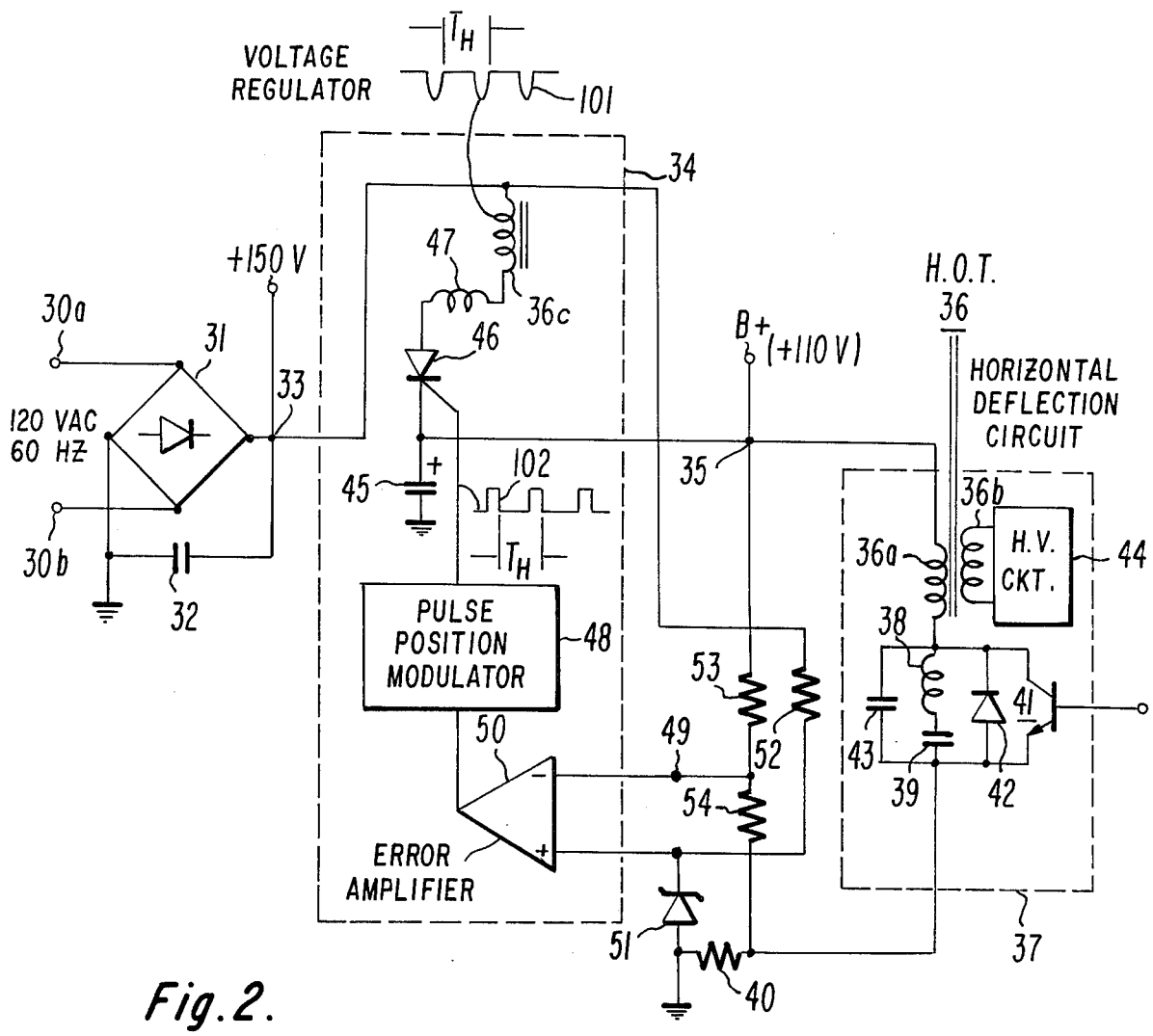
FIG. 2 illustrates an embodiment of the invention.

The circuit of FIG. 2, which embodies the invention, provides for raster width regulation with much less power dissipation than the circuit of FIG. 1. AC line voltage at terminals 30a and 30b is coupled to input terminals of a full wave bridge rectifier 31. A power supply filter capacitor 32 is coupled across output terminals of the bridge rectifier, and a mostly filtered but unregulated DC voltage is obtained at a bridge output terminal, the voltage illustratively shown as +150 volts.

The +150 volts is coupled to an input terminal 33 of a voltage regulator 34. A regulated B+ voltage is obtained at an output terminal 35 of regulator 34, the voltage illustratively shown as +110 volts. The B+ voltage at terminal 35 is coupled to one end of a primary winding 36a of a horizontal output transformer 36 of a horizontal deflection circuit 37. The other end of primary winding 36a is coupled to a horizontal deflection winding 38. Horizontal deflection winding 38 is coupled to ground through an "S" shaping capacitor 39 and a current sensing resistor 40. Coupled across winding 38 and capacitor 39 is a horizontal switching transistor 41, a damper diode 42, and a retrace capacitor 43. The base of transistor 41 is coupled to a conventional horizontal oscillator and driver circuit, not shown, for producing, in a conventional manner, scanning current at a horizontal frequency rate of $1/T_H$ in a deflection winding 38. Retrace pulses from deflection winding 38 are coupled through a tertiary winding 36b to a high voltage circuit 44 for providing an accelerating potential to the ultor of a cathode ray tube of a television receiver, not shown.

The operation of voltage regulator 34 is such that voltage regulation is achieved without the necessity of large dissipative losses in order to maintain the B+ voltage at terminal 35 constant. Input terminal 33 is coupled to a secondary winding 36c of horizontal output transformer 36. Winding 36c is coupled to the anode of an SCR 46 through an inductor 47. The cathode of SCR 46 is coupled to the B+ output terminal 35 and to ground through a filter capacitor 45.

To provide load current to the horizontal deflection circuit 37, SCR 46 is switched at a horizontal rate by gating pulses 102 obtained from a pulse position modulator 48. The amount of current provided is determined by the conduction time of SCR 46. For varying load and line conditions, the conduction time of SCR 46, that is, the on-off duty cycle, is also varied accordingly by varying the phase of gating pulses 102. Thus, SCR 46 functions as a variable reactive impedance for regulating the B+ voltage.

The voltage at the bottom of secondary winding 36c relative to ground for one deflection cycle is illustrated in FIG. 32, waveform 101. By selecting appropriate polarities for windings 36a and 36c, waveform 101 is a constant voltage 101a during the trace interval from $T_1 - T_4$, and a negative-going retrace pulse 101b during the retrace interval from $T_4 - T_7$.

As shown in FIG. 3b, a gating pulse 102a is coupled at time $T_2$ to the gate of SCR 46, causing it to conduct. The voltage appearing across inductor 47 is integrated, and an increasing current flows through SCR 46 from times $T_2 - T_4$. To shut off SCR 46, the negative-going retrace pulse, beginning at time $T_4$, decreases the current flowing through the SCR to below the necessary holding current level at time $T_5$. As shown by FIG. 3d, the voltage at the anode of SCR 46 equals the B+ voltage of +110 volts when the SCR conducts and equals the voltage at the bottom of winding 36c otherwise.

Varying the phase of gating pulses 102 within each horizontal trace interval for maintaining voltage regulation is achieved by coupling through a negative feedback loop a first feedback voltage representative of the B+ voltage to an inverting terminal 49 of an error amplifier 50. The voltage at a noninverting terminal is maintained at a reference potential by zener diode 51. The cathode of zener diode 51 is coupled to terminal 33 through a current limiting resistor 52. The first feedback voltage is derived at the junction of a resistor 53 and a resistor 54 of a voltage divider coupled to the B+ output terminal 35.

The output voltage of error amplifier 50 is coupled as a control voltage to pulse position modulator 48. Variations in B+ voltage result in variations of the first feedback voltage which result in variation of the control voltage coupled to modulator 50. Varying the control voltage will adjust the phase of gating pulses 102, thus varying the on-off duty cycle of SCR 46, providing appropriate regulation. Turning on the SCR earlier in each trace interval will compensate for low line conditions and/or heavy load current drain by horizontal deflection circuit 37. Turning on SCR 46 later will compensate for high line conditions and/or light load current drains.

Under high line conditions, the voltage at terminal 33 will begin to increase over +150 volts, momentarily increasing the voltage at the B+ output terminal 35. The feedback voltage at inverting terminal 49 increases changing the control voltage to pulse position modulator 48. The phase of gating pulses 102, relative to the beginning of each horizontal trace interval, lags. As shown in FIG. 3b, a gating pulse 102b arrives at the gate of SCR 46 at a later time $T_3$. The current through SCR 46 going to the load, waveforms 103c and 103d of FIG. 3c, now begins at time $T_3$ and ends at time $T_6$, thus changing the on-off duty cycle of SCR 46. The average load current over each horizontal deflection cycle decreases, thereby maintaining the B+ output voltage constant under high line conditions.

By placing a current sensing resistor 40 in a second feedback loop of regulator 34, raster width regulation is achieved without incurring the relatively large power dissipations of the prior art circuits. As beam loading of high voltage circuit 44 increases, the load current drawn by horizontal deflection circuit 37 increases. The voltage across sensing resistor 40 increases. This voltage serves as a second feedback voltage coupled to inverting terminal 49 of error amplifier 50. The increased feedback voltage at terminal 49 adjusts the phase of gating pulses 102, relative to the phase they would have been, had no second feedback voltage been provided. The added second feedback voltage thus adjusts the on-off duty cycle of SCR 46 and deregulates the B+ voltage at output terminal 35 by decreasing the B+ voltage sufficiently to compensate for the blooming effect of the decreased ultor potential.

The voltage drop needed for raster width regulation in the circuit of FIG. 2, unlike in the prior art circuit of FIG. 1, is obtained by increasing the reactive impedance of regulator 34. This result is accomplished by means of the second feedback loop which provides, in effect, a positive feedback voltage to regulator 34. As the load current increases, the B+ voltage at terminal 35 tends to momentarily decrease. The first feedback loop attempts to increase the voltage at terminal 35. However, due to the positive feedback of the second feedback loop, the voltage at terminal 35 nevertheless decreases sufficiently to provide raster width regulation.

Prior art circuits, such as those of FIG. 1, decrease the voltage coupled to the horizontal deflection circuit by means of an increased voltage drop across a resistive element. The circuit of FIG. 2, embodying the invention, involves relatively little resistive dissipation. Regulation is achieved by varying the reactive component of the impedance of regulator 34. Because resistor 40 is included in the feedback loop of regulator 34, the loop gain of the circuit is sufficiently great so that the feedback voltage developed by resistor 40 need be relatively small. The resistance of resistor 40 may then be selected of relatively small value, and the power dissipation, unlike the circuit of FIG. 1, will also be relatively small.

The +110 volt B+ voltage at terminal 35 is shown illustratively as less than the voltage of +150 volts at input terminal 33. This lower B+ voltage is more advantageous for a transistorized horizontal deflection circuit, such as circuit 37. The invention, however, may be practiced with B+ voltages, both lower and higher than the input voltages to the regulator. If a higher B+ voltage is desired, the conduction time of SCR 46 is initially increased until the charge on capacitor 45 reaches the higher B+ voltage, after which time the regulator operates as previously described.

Capacitor 45 acts as a filter for horizontal rate energy flowing through terminal 35. Capacitor 45, if desired, may be coupled across terminals 33 and 35 instead of from terminal 35 to ground. Under such an arrangement, little horizontal rate energy will flow through power supply filter capacitor 32 and little RMS heating of capacitor 32 will occur.

Voltage regulators other than the one illustrated in FIG. 2, such as the regulator described in U.S. Pat. No. 3,832,595, granted to W. F. W. Dietz, may be used. Switching regulators are still other types which may be used in place of regulator 34. By placing a load current sensing circuit in a positive feedback loop of regulator 34, B+ deregulation for raster width control is thereby economically accomplished.

What is claimed is:

1. A raster width regulation circuit, comprising:
   a deflection circuit;
   a variable impedance means responsive to a source of unregulated voltage for providing a first direct current voltage to said deflection circuit, said variable impedance means including a variable reactive impedance means coupled to said deflection circuit, said deflection circuit drawing a load current from said variable impedance means which tends to decrease the magnitude of said first direct current voltage; and
   first feedback means coupled to said variable impedance means and responsive to said load current for providing a first feedback voltage for increasing the magnitude of said reactive impedance means as said load current increases for further decreasing the magnitude of said first direct current voltage for maintaining a substantially constant raster width.

2. A circuit according to claim 1 including second feedback means coupled to said variable impedance means and responsive to said first direct current voltage for maintaining said first direct current voltage constant as said unregulated voltage and said load current varies.

3. A circuit according to claim 1 wherein said reactive impedance means comprises a controlled switch, the conduction time of said switch varying in response to said first feedback voltage.

4. A circuit according to claim 3 wherein said variable impedance means includes first means coupled to said controlled switch for providing a first signal to said switch at a first frequency rate for changing the conduction of said switch from a first state to a second state at said first frequency rate.

5. A circuit according to claim 4 wherein said first frequency is a horizontal deflection frequency and said first means is responsive to said first feedback voltage for varying the phase of said first signal within each horizontal deflection cycle.

6. A raster width regulation circuit, comprising:
   a deflection circuit;
   a variable impedance means responsive to a source of unregulated voltage for providing a first direct current voltage to said deflection circuit, said deflection circuit drawing a load current from said variable impedance means, said variable impedance means comprising:
   reactive impedance means coupled to said deflection circuit;
   a controlled switch coupled to said reactive impedance means;
   first means coupled to said controlled switch for providing a horizontal rate first signal to said controlled switch for changing the conduction of said controlled switch from a first state to a second state at said horizontal rate;
   a secondary winding of a horizontal output transformer coupled in series with said controlled switch for causing said controlled switch to become nonconductive within each horizontal deflection interval; and
   first feedback means coupled to said variable impedance means and responsive to said load current for providing a first feedback voltage for varying the phase of said first signal within each horizontal deflection cycle for increasing the magnitude of said reactive impedance means as said load current increases for maintaining a substantially constant raster width.

7. A circuit according to claim 6 wherein said controlled switch comprises a silicon controlled rectifier.

8. A circuit according to claim 6 including second feedback means coupled to said variable impedance means and responsive to said first direct current voltage for maintaining said first direct current voltage constant as said unregulated voltage and said load current varies.

9. A circuit according to claim 6 wherein said source of unregulated voltage comprises rectifying means responsive to a source of alternating current voltage for providing to said variable impedance means a second direct current voltage.

10. A circuit according to claim 9 wherein the magnitude of said first direct current voltage is less than the magnitude of said second direct current voltage at a predetermined value of said second direct current voltage.

11. A circuit according to claim 10 wherein said deflection circuit includes a switching transistor coupled to a deflection winding for generating trace and retrace currents in said deflection winding during each deflection cycle.

12. A raster width regulation circuit, comprising:
    a deflection circuit;
    a voltage regulator including filter means coupled to said deflection circuit and responsive to a source of unregulated voltage for providing a first direct current voltage to said deflection circuit, said deflection circuit drawing a load current from said regulator which tends to decrease the magnitude of said first direct current voltage;
    first feedback means coupled to said regulator for providing a first feedback voltage to said regulator for maintaining said first direct current voltage constant; and
    second feedback means coupled to said voltage regulator and responsive to said load current for providing a positive feedback voltage to said regulator for further decreasing the magnitude of said first direct current voltage as said load current magnitude increases for providing raster width regulation.

13. A circuit according to claim 12 wherein said regulator has a resistance small relative to the total internal impedance exhibited by said regulator to said deflection circuit.

14. A circuit according to claim 12 wherein said deflection circuit comprises a horizontal deflection circuit and wherein increased video beam loading of a high voltage circuit of said horizontal deflection circuit increases the load current drawn from said regulator.

15. A circuit according to claim 12 wherein said load current flows through a controlled semiconductor, the on-off duty cycle of said controlled semiconductor being determined by said first feedback voltage.

16. A circuit according to claim 15 wherein said on-off duty cycle is adjusted in response to said positive feedback voltage for adjusting the magnitude of said first direct current voltage.

17. A raster width regulation circuit, comprising:
   a deflection circuit;
   a voltage regulator responsive to a source of unregulated voltage for providing a first direct current voltage to said deflection circuit, said voltage regulator including a controlled semiconductor switching conductive states at a horizontal rate and through which load current drawn by said deflection circuit flows and including filter means coupled to said deflection circuit;
   first feedback means coupled to said voltage regulator for providing a first feedback to said regulator for controlling the on-off duty cycle of said controlled semiconductor for maintaining said first direct current voltage constant;
   a secondary winding of a horizontal output transformer of said deflection circuit coupled in series with said controlled semiconductor for cutting off the conduction of said controlled semiconductor during each horizontal deflection interval; and
   second feedback means coupled to said regulator and responsive to said load current for providing a positive feedback voltage to said regulator for adjusting the on-off duty cycle of said controlled semiconductor for adjusting the magnitude of said first direct current voltage as said load current varies for providing raster width regulation.

18. A circuit according to claim 17 wherein said first feedback means comprises a voltage divider circuit.

19. A circuit according to claim 17 wherein said load current flows through a current sensing resistor.

* * * * *